Patented June 24, 1930

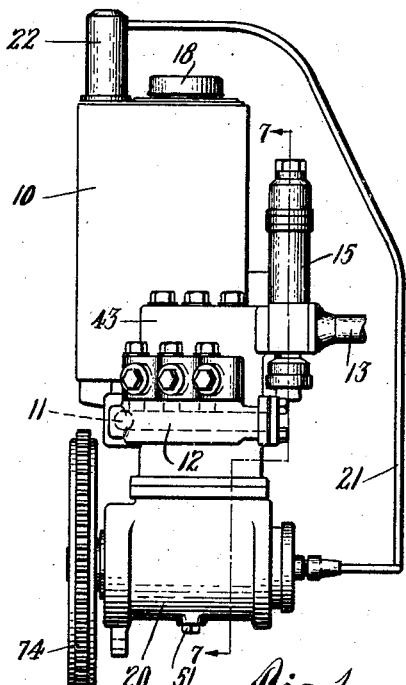
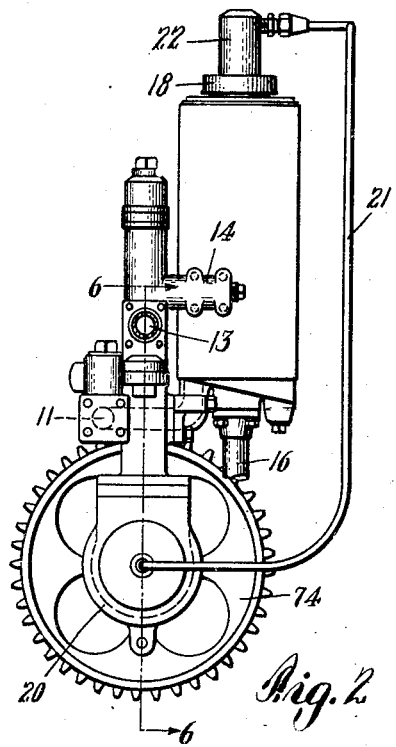
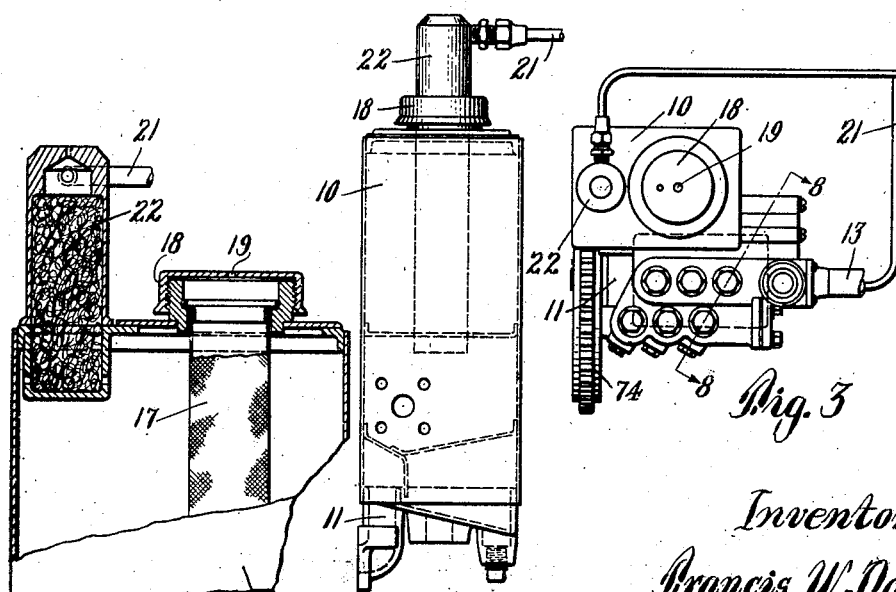

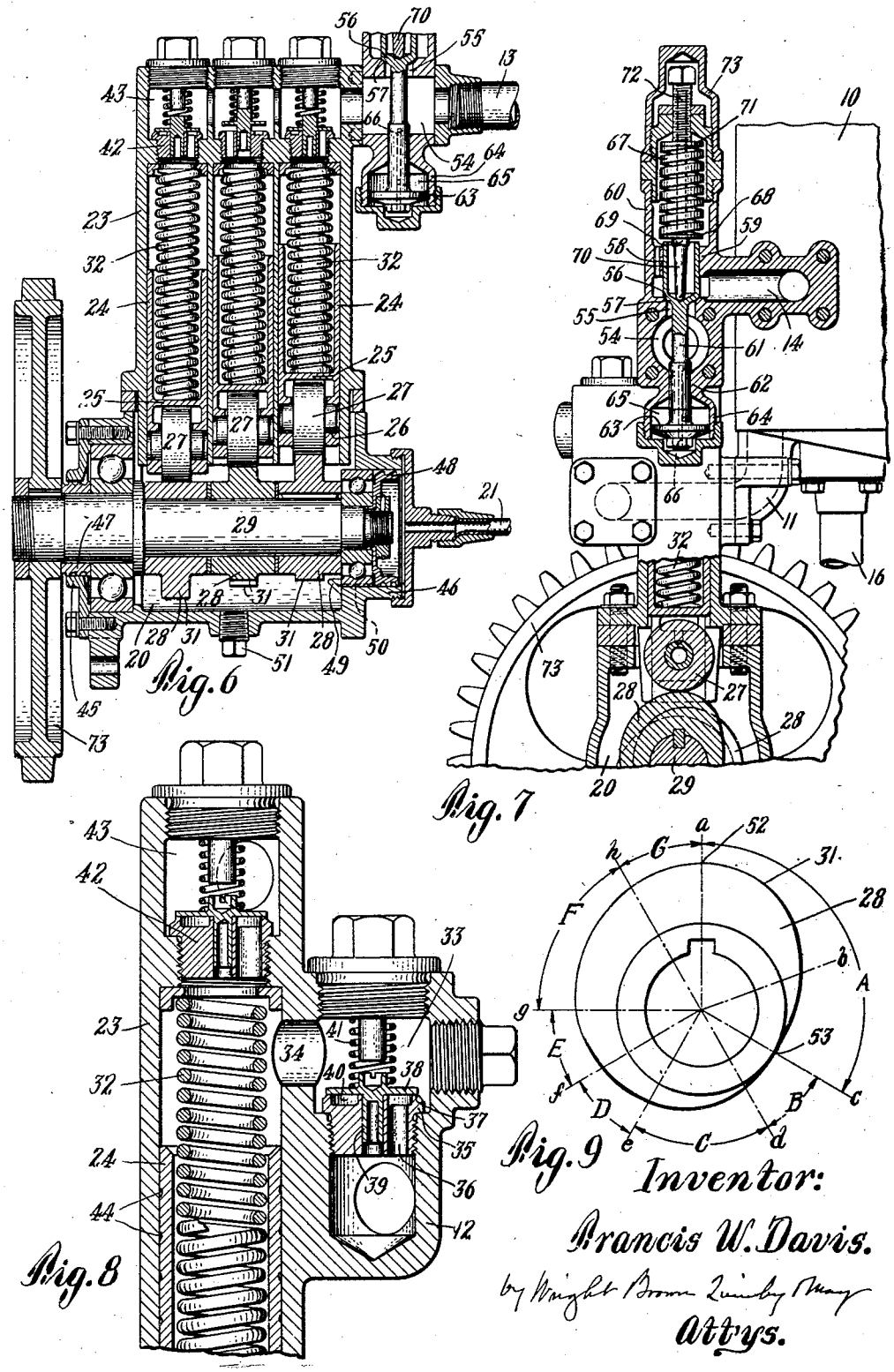

1,766,610

UNITED STATES PATENT OFFICE

FRANCIS W. DAVIS, OF WALTHAM, MASSACHUSETTS

PUMP

Application filed April 25, 1927. Serial No. 186,190.

This invention relates to a pump for delivering fluid under pressure. While capable of being used for all the purposes for which pumps are ordinarily used, the pumps embodying the present invention are also fitted for special service to meet exacting requirements. In particular, a pump made according to the invention is characterized by a strict uniformity of flow when the pump is operated at a constant speed, a practical absence of noise and vibration even when the pump is operated at high speeds, and a very large rate of delivery for its size at a wide range of pressures subject to sudden changes. Such requirements are found, for example, in such cases as a fluid power system for an automobile steering gear, brakes and the like, where the necessity for economy of weight and space is combined with the necessity for a comparatively large delivery at widely varying pressures and freedom from excessive sound or vibration. In addition to these requirements, the pump must be sturdy and capable of performing well even after considerable wear. For such exacting requirements, a multi-cylinder, reciprocating pump is found to be the most effective practical type of pump. Such a pump if properly constructed according to my invention will operate satisfactorily even under adverse conditions, and can be made to deliver a strictly uniform flow with a minimum of sound and a practical absence of vibration. According to the invention, a plurality of cylinders are employed, three being shown and described by way of illustration, although more could be employed if desired. The pistons in the cylinders are cam-operated on their pumping strokes, the cams being designed so that the sum of the flows from the three cylinders is always constant for a given speed of operation of the pump. The pistons on their return strokes are operated by any convenient means such as the springs shown on the drawings, but it is obvious that cams or other equivalent means could be employed for that purpose. It is obvious that the delivery of a strictly uniform flow directly from the pump obviates the necessity for air-domes or other cushioning devices usually found necessary with reciprocating pumps to smooth out the pulsations in the delivery flow. In a system such as a hydraulic steering gear, it is especially desirable that no elastic element such as a body of air be included therein as such an element introduces a lag in and an uncertainty of action on the part of members actuated by the power fluid, especially when the type of service (as in an automobile steering gear) requires instant actuation of such members against the opposition of forces of various magnitudes.

Where power fluid is supplied to a mechanism to be actuated thereby, as in the case of an automobile power steering gear, it is advisable to provide a relief valve in the discharge line to relieve the pump of excessive pressures which might otherwise result from an obstruction in the mechanism or from certain conditions of operation. By my invention, I provide such a valve associated with the pump and constructed in such a way that its operation is practically silent and is exceptionally dependable. The pump and relief valve form a compact efficient unit which is almost silent in operation, is practically free from vibration and chattering, and which is durable and dependable.

Various other advantageous features of construction will be apparent to one skilled in the art from the disclosure of the invention in the following description and on the drawings, of which,—

Figure 1 is a side elevation of a single acting pump embodying my invention, a reservoir or supply tank being shown therewith.

Figure 2 is an end elevation of the same.

Figure 3 is a plan view of the same.

Figure 4 is a rear end elevation of the reservoir.

Figure 5 is a sectional detail of a portion of the tank.

Figure 6 is a longitudinal section of the pump and a portion of the relief-valve mechanism.

Figure 7 is a section on the line 7—7 of Figure 1.

Figure 8 is a section on the line 8—8 of Figure 3.

Figure 9 is an outline of one of the edge cams employed to actuate the pump pistons.

Referring to the drawings in detail, the circulation system for power fluid comprises a tank or reservoir 10 from which a suitable pipe 11 leads to the intake manifold 12 of the pump. The discharge pipe from the pump is indicated at 13, this discharge pipe leading to a fluid motor or other device (not shown) for which the power fluid is desired. In order to provide against injury due to a possible excess of fluid pressure in the discharge pipe 13, a relief valve 15 may be connected to the discharge pipe 13, fluid escaping through the relief valve being returned directly to the tank as by a pipe 14 which with the valve 15 forms a by-pass for the fluid around the fluid-operated mechanism. The preferred structure of the relief valve 15 will be hereinafter described in detail. A return pipe 16 is provided to conduct the fluid back to the reservoir 10 after it has passed through the mechanism to which it was conducted by the pipe 13. The tank 10 may be filled through an opening in the top thereof in which may be placed a suitable strainer 17 and which may be closed by a suitable cap 18 preferably provided with a small air vent 19. Means may also be provided, as will be hereinafter described, for removing excess fluid which may accumulate in the lower casing 20 of the pump and returning such excess fluid to the tank 10 as by a suitable pipe 21 which preferably leads to a filter 22 by which foreign matter is prevented from entering the tank.

Referring to the pump mechanism, particularly as illustrated in Figures 6 and 8, 23 indicates the upper casing of the pump containing a plurality of cylinders in which are slidably mounted suitable pistons 24. In the pump illustrated on the drawings, three cylinders are provided, but it is obvious that more cylinders can be used if desired. The pistons 24 have the general shape of a hollow cylinder, open at the upper end and closed adjacent to the lower end as at 25. The pistons 24 are of considerable length, and bear against the inner wall of their respective cylinders practically over their entire length so that any tendency on the part of the pistons to tilt and bind when reciprocated in their cylinders is thus minimized. The lower portion of each piston 24 is provided with a bearing 26 in which is journaled a roller 27. The roller 27 acts as a cam follower and cooperates with a cam member 28 mounted therebelow upon a suitable shaft 29 which carries a cam member for each piston. The cam member 28 may be formed with a cylindrical body or hub having a central flange shaped to serve as an edge cam and to engage against the periphery of a roller 27. It is obvious from this arrangement that the reciprocating motion of each piston 24 will be governed by the shape of its cam 28 provided the roller 27 is kept in contact with the cam surface 31. To this end, a suitable spring 32 may be provided to bear against each piston and to press the roller 27 against its cam surface 31. In order to avoid buckling tendencies which are liable to increase the friction of the pistons on the cylinder walls, the spring 32 is extended into the open end of the piston and bears against the portion 25 which closes the piston near its lower end. The upper end of the spring bears against the upper end of the cylinder and the spring is preferably under sufficient compression to hold the roller 27 against the cam surface 31 under all conditions of operation. The power fluid used in the circulation system may be any fluid desired for the purpose. For many purposes, certain kinds of oil are found satisfactory and the power fluid will hereinafter for brevity be referred to as "oil", though I do not limit myself in any way to any particular fluid. The oil from the tank 10 enters the manifold 12 at the side of the cylinder casing 23 and thence passes upwardly through a suitable one-way check valve into a passage 33 which leads into the upper portion of a cylinder through the side wall thereof as at 34. The check valve may be of any desired construction, and is preferably made in such a way as to provide efficient service with a minimum of noise. As shown, each valve comprises a plug 35 which is provided with one or more ports 36 leading from the supply manifold upwardly into the passage 33. The upper rim of the plug 35 forms a valve seat 37 on which rests a valve member comprising a disk 38 with a stem 39 which extends downwardly and is slidably fitted into a suitable central bore in the plug 35. The upper portion of the plug 35 is provided with an annular recess 40 into which the ports 36 lead and from which the oil escapes into the passage 33 when the valve member 38 is lifted. On account of the relatively large peripheral contact between the valve disk 38 and its seat 37, a relatively slight lifting of the valve member will be sufficient to permit a relatively large flow of oil. A suitable spring 41 may be provided to press the valve member 38 against its seat 37. A similar plug 42 is provided at the upper end of each cylinder to form a one-way outlet for oil to escape from the cylinder into the discharge manifold 43 which communicates with the discharge pipe 13. The valve mechanism carried by the plug 42 may be identical with that carried by the plug 35, and in the drawing is shown as such. The piston 24 on its downward stroke draws oil into the cylinder from the manifold 12 past the check valve 38, and on its upward stroke forces the oil upwardly through the check valve carried by the plug 42 and into the discharge manifold 43 and the pipe 13. If desired, suitable rings may be provided for each of the pistons 24. As illustrated on the drawings, the pistons are not provided with rings, but have a series of peripheral grooves 44 which serve to retain a portion of oil which works its way downwardly between the pistons and the walls of the cylinders during the operation of the pump, thus insuring thorough lubrication of the pistons within the cylinders. Since oil which thus works down past the pistons is liable to collect in excessive amounts in the lower casing 20 of the pump, especially after the cylinders and pistons have been subjected to considerable wear, I provide means for removing the excess of such oil. For this purpose, the lower casing 20 is provided with suitable glands 45, 46 at the ends thereof. These glands include respectively spiral impellers 47, 48 which are fixed to the shaft 29 and rotate therewith. The threads on the impellers 47, 48 are arranged so that during the operation of the pump, the direction of motion of fluid entrained by the threads of the impellers, as shown in Figure 6, is toward the right. Thus the impeller 47 during the operation of the pump admits air into the lower casing 20 while the impeller 48 entrains oil which has spilled over a suitable lip 49 and passed through a channel 50 to the threads in the impeller 48. The oil thus picked up by the impeller 48 is forced into the pipe 21 and thence into the tank 10 through the filter 22. The lip 49 in the casing 20 is placed at a suitable height to maintain sufficient oil in the bottom of the casing to provide for the lubrication of the shaft bearings. The casing 20 may be provided with a suitable drain plug 51 so that all the oil may be removed if desired.

The cam surfaces 31 which control the motion of the pistons are so shaped, as illustrated in Figure 9, as to produce a strictly uniform rate of flow of oil through the discharge pipe 13 when the pump is operated at a constant speed. The shape of the cam is at the same time modified in portions so as to accelerate each piston at the beginning of each stroke and to decelerate the pistons as they near the ends of their strokes. These accelerations and decelerations are also balanced in such a way that the uniformity of the flow is not affected. As a specific example of a cam which is capable of performing these functions in a three-cylinder pump, reference may be had to the particular shape illustrated in Figure 9, but it is understood that if more cylinders and pistons are employed, the shape of the cam may be modified accordingly to produce the same desired results. As shown in Figure 9, the cam surface comprises a high point 52 and a low point 53 spaced from each other about the axis of the shaft by an angle of 120°. The high and low points represent respectively the points of greatest and least radial distance of the cam surface 31 from the axis of the shaft 29. The cam, as shown in Figure 9, is designed for counterclockwise rotation, that is, the roller 27 may be thought of rolling about the periphery of the cam in a clockwise direction. For convenience in description, the roller will be thought of as moving about the cam, although in actual operation the roller is held above the cam and the cam rotates. At the high and low points of the cam, the radial velocity of the roller is zero. In moving through the arc A, that is, from angular position $a$ to $c$, the surface of the cam between these points is so shaped that the velocity of the roller radially inward is accelerated from zero to a maximum at $b$ which is preferably about 70° from $a$. From this point its inward rate of motion is decelerated until at $c$, which corresponds to the low point 53, its radial velocity is zero. From $c$ to $d$ the roller is accelerated outwardly through an angle of 30° represented by the arc B. From $d$ to $e$ the roller moves outwardly at a constant rate through an angle of 60° represented by C. From $e$ to $f$ the roller passes through an angle of 30° represented by D in which its outward velocity is still further accelerated. In the 30° angle E between $f$ and $g$, the outward motion of the roller is decelerated so that at $g$ its outward velocity is equal to that which it had through the angle C. This constant outward velocity extends through a 60° angle F from $g$ to $h$, after which the outward motion of the roller is decelerated through a 30° angle G until its radial velocity at $a$ is zero. All three of the cam surfaces 31 are of identical construction and are arranged on the shaft 29 so that their high points are spaced by angles of 120° about the axis of the shaft. It will be obvious that the velocity of each piston will be governed by the rate at which the surface 31 approaches the axis of the shaft or recedes therefrom and the rate of delivery of oil from each cylinder into the discharge manifold will be governed by the velocity of the piston when the cam follower 27 is on a portion of the surface 31 which is receding from the axis. By comparing any set of three points angularly spaced around the axis by angles of 120°, it will be found that the sum of the rates of delivery of fluid into the discharge manifold by the several pistons is always constant, and that the portions of the surface which cause acceleration outwardly are balanced by portions of deceleration outwardly on one of the other cams, and vice versa. In this way, not only are the acceleration and deceleration of the pistons at the beginning and ending of their strokes provided for, but at the same time a mathematically uniform flow of fluid through the discharge pipe is maintained.

As shown in Figures 6 and 7, the discharge manifold communicates with the discharge pipe 13 through a suitable chamber 54 from which extends a pressure relief passage 55 which is normally closed by a valve 56 engaging on a seat 57. The valve 56 is provided with a hollow elongated portion 58 extending upwardly above the seat-engaging portion and fitted for sliding engagement with an inwardly extending flange 59 of the valve casing 60. Extending below the valve member 56 is a valve stem 61 which as shown passes through the chamber 54, is in sliding contact with a portion 62 of the valve casing, and has a disk 63 secured to the lower end thereof. The disk 63 is fitted for sliding engagement with the walls of a chamber 65 formed in the lower portion 64 of the valve casing. Any preferred means for allowing liquid a restricted flow past the disk 63, such as a loose fit of the disk in the casing, may be employed. I prefer, however, to provide a small passage 66 extending through the lower portion of the valve stem 61 to connect the chamber 54 with the portions of the chamber 65 which are above and below the disk 63. This construction thus provides a dash pot which prevents any rapid motion on the part of the valve member since the chamber 65 is constantly filled with oil which is practically incompressible and must flow in and out through the restricted passage 66 whenever the valve member moves. The upper portion 58 of the valve member, the lower portion of the valve stem, and the edge of the disk 63 all provide longitudinally spaced bearing surfaces for the valve member which prevent any tendency on the part of the valve member to tilt axially and to bind on the walls of the casing under the opposed forces acting thereon. The valve member is normally pressed against its seat as by a suitable spring 67 which bears at its lower end against a plate 68 supported by a shoulder 69 of a rod 70 which extends upwardly through the spring and downwardly into the hollow interior of the upper portion 58 of the valve member, the lower end of the pin 70 engaging the valve member at a point approximately on a level with the valve seat 57 when the valve is seated. This arrangement also is for the purpose of obviating still further any buckling effect or tendency on the part of the valve member to bind. Thus the valve member is dependable in its action and always opens to relieve pressure when the fluid pressure reaches a definite predetermined amount. The upper end of the spring 67 bears against a plate 71 which abuts a threaded member 72 and is adjustable thereby to regulate the compression of the spring 67. The threaded member 72 is hollowed for a portion of its length to receive and guide the upper end of the pin 70. A suitable cap member 73 may be fitted to the upper portion of the valve casing to cover the projecting portion of the threaded member 72. When excess pressure in the chamber 54 causes the valve member to lift against the pressure of the spring 67, oil is allowed to escape past the valve into a by-pass pipe 14 which leads directly to the tank 10. The spaced bearing surfaces of the valve member both above and below the valve seat, and the arrangement of the pin 70 to apply the force of the spring 67 at a point practically on a level with the area of opposing fluid pressure which tends to lift the valve, result in a freedom from binding or sticking which insures great dependability. The dash pot structure associated with the lower end of the valve member prevents chattering and insures a practically silent operation of the valve.

The pump may be driven by any suitable means. As shown on the drawings, a gear or sprocket wheel 74 is provided on the shaft 29, which wheel may be connected to the cam shaft of an automobile engine where the pump is used on an automobile.

Having thus described certain embodiments of my invention, it should be evident to those skilled in the art that various changes and modifications may be made therein without departing from its spirit or scope as defined by the appended claims.

I claim:—

1. In a single acting three-cylinder reciprocating pump having pistons in its cylinders, means for reciprocating said pistons to deliver from the pump a strictly uniform flow of fluid, said means comprising an edge cam for each piston rotatable about an axis, each said cam having a surface with high and low points or points of maximum and minimum distance from the axis of rotation, said high and low points being spaced by substantially 120°.

2. In a single-acting three-cylinder reciprocating pump having pistons in its cylinders, means for reciprocating said pistons to deliver from the pump a strictly uniform flow of fluid, said means comprising an edge cam rotatable about an axis, said cam having a cam surface with high and low points, or points of maximum and minimum radial distance from the axis of rotation, angularly spaced by substantially 120° about said axis, the rate of approach of said surface to said axis increasing from zero, then decreasing to zero in passing from the high point to the low point, said surface in passing from the low point to the high point having successive segments of different radial change comprising a segment of accelerated increase of radial distance, a segment of constant increase, a segment of said constant increase augmented by an accelerated increase, a segment of said constant increase diminished by deceleration, a segment of said constant increase, and a segment of deceleration to zero rate of increase at said high point.

3. In a single acting three-cylinder reciprocating pump having pistons in its cylinders, means for reciprocating said pistons to deliver from the pump a strictly uniform flow of fluid, said means comprising an edge cam mounted for rotation on an axis, said cam having a cam surface with a high point and a low point angularly spaced about said axis by approximately 120°, the path of said surface in passing from the high point to the low point approaching the axis at an accelerated rate through an angle of 70° from the high point and at a decelerated rate through the remaining angular distance to the low point, said path also in passing from said low point to said high point receding from the axis at an accelerated rate through an angle of 30°, then receding at a constant rate for 30°, then at an accelerated rate for 30°, then at a decelerated rate for 30°, then at a constant rate for 30°, then at a decelerated rate for 30° to zero rate at the high point.

In testimony whereof I have affixed my signature.

FRANCIS W. DAVIS.